April 12, 1966     P. F. ELARDE     3,246,236
CIRCUIT FOR MEASURING MAGNETIC FLUX CHANGES
Filed Jan. 30, 1962
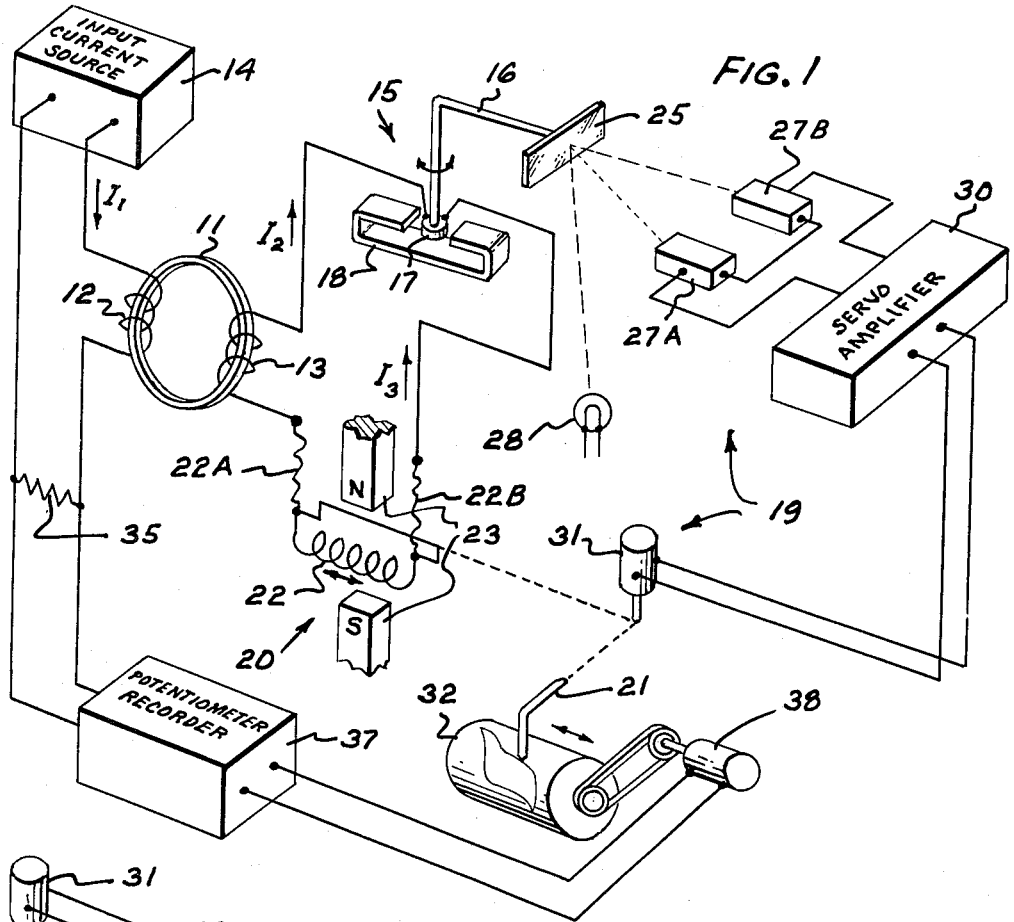
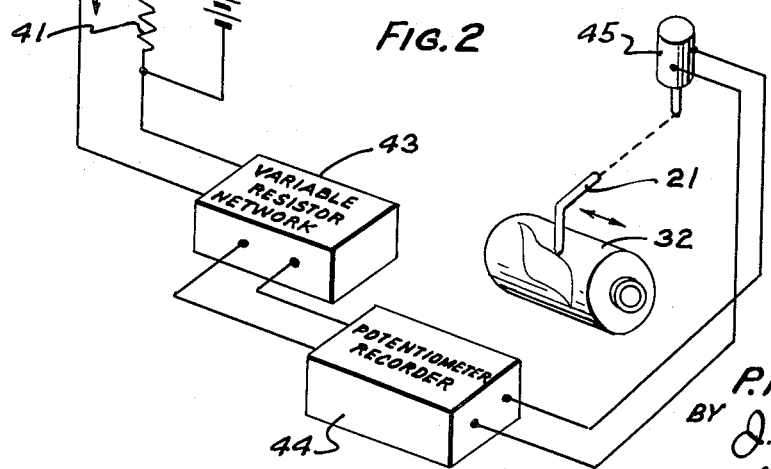
INVENTOR
P. F. ELARDE
BY J. L. Landis
ATTORNEY

United States Patent Office 3,246,236
Patented Apr. 12, 1966

3,246,236
CIRCUIT FOR MEASURING MAGNETIC FLUX CHANGES
Paul F. Elarde, Naperville, Ill., assignor to Western Electric Company, Incorporated, New York, N.Y., a corporation of New York
Filed Jan. 30, 1962, Ser. No. 169,743
3 Claims. (Cl. 324—47)

This invention relates to a circuit for measuring magnetic flux changes, and more specifically to a circuit for controlling the plotting of magnetic characteristics of magnetic components. Objects of this invention are to provide new and improved circuits of such nature.

In the testing of magnetic components, it is often desirable to plot magnetic characteristics of the magnetic components, particularly the hysteresis loop, to ascertain whether or not the magnetic components meet prescribed requirements. In known commercially available systems (particularly as disclosed in R. F. Edgar Patent 2,054,672) a coil, associated with a magnetic component under test, and a current responsive instrument are connected in series with the primary of a mutual inductance or transformer. An auxiliary current source for providing continuous current and a meter or recording instrument for indicating amplitudes of flux changes in the magnetic component are connected in series with the secondary of the mutual inductance. A photoelectric control circuit operates in response to deflections of the current responsive instrument to control the amplitude of the continuous current supplied by the auxiliary current source.

When a flux change is induced in a magnetic component under test, a current is induced in the coil associated therewith which causes the current responsive instrument to deflect slightly in proportion to the amount of the flux change. In response to the deflection of the current responsive instrument, the photoelectric control circuit operates to vary the amplitude of the continuous current supplied by the auxiliary current source. When the amplitude of the continuous current is varied, a current is induced in the mutual inductance primary which opposes the current induced by the flux change in the magnetic component so that the current responsive instrument is only permitted to deflect slightly, and the meter or recording instrument indicates the amplitude of the flux change in the magnetic component in response to sensing the amount of change in the continuous current.

Another object of this invention is to provide an improved circuit for indicating the amplitudes of flux changes induced in a magnetic component wherein the deflection of a current responsive instrument is not proportional to the amplitude of a flux change induced in the magnetic component, but rather the current responsive instrument only deflects slightly to initiate operation of a flux change indicating instrument and a flux change compensating device within the circuit, and wherein the current responsive instrument is returned to a nondeflected position at the completion of inducing a flux change in the magnetic component by operation of the flux change compensating device so that the flux change indicating instrument and the flux change compensating device cease to operate.

An additional object of this invention is to provide an improved circuit for measuring flux changes induced in a magnetic component which is more stable, more sensitive, and more economical than present commercially available circuits.

With these and other objects in mind, the present invention relates to a circuit for measuring flux changes induced in a magnetic component under test by sensing currents induced in a conductor electromagnetically associated with the magnetic component when flux changes are induced in the magnetic component. Whenever the word "induced current" is used hereinafter in connection with changes in flux, it is to be understood that the words "electromagnetomotive force" (E.M.F.), or simply "voltage" may be used interchangeably with the former, as the integral of the resultant induced voltage is a function of the total flux change. A current responsive instrument is connected in series with the conductor and has a movable element which deflects in response to currents induced in the conductor. A circuit component for inducing currents is also connected in series with the conductor to provide currents which oppose the currents induced in the conductor by flux changes induced in the magnetic component. A control circuit responds to a slight deflection of the movable element of the current responsive instrument to (1) operate a flux change indicating device which indicates the amplitudes of flux changes induced in the magnetic component and (2) operate the current inducing circuit component so that the movable element of the current responsive instrument is either maintained in a substantially nondeflected position during a measuring operation involving slow rates of change in flux, or is returned to the nondeflected position from a slightly deflected position (which is not necessarily proportional to the total flux change), at the completion of a measuring operation involving rapid rates of change in flux.

Other objects, advantages and features of the invention will become apparent by reference to the following detailed description and the accompanying drawings which illustrate a preferred embodiment thereof, in which:

FIG. 1 is a schematic diagram of a preferred embodiment of the invention illustrating the electrical circuitry; and FIG. 2 is a schematic diagram of a modification of FIG. 1 to provide for varying the sensitivity of the circuit.

Referring now to FIG. 1, a magnetic core 11 that is to be tested is provided with a primary winding 12 and a secondary winding 13 which are wound thereon so as to be electromagnetically associated therewith. Magnetizing current signals $I_1$ are applied to the primary winding 12 by an input current source 14 to induce flux changes in the magnetic core 11, and current signals $I_2$ are induced in the secondary winding 13 in response to flux changes in the magnetic core 11. The input current source 14 is regulatable and may be regulated manually or automatically to provide any desired magnetizing signal, such as a triangular or sawtooth signal, so that the magnetic core 11 may be driven from one state of magnetic saturation to the other state of magnetic saturation in any desired manner.

A current responsive instrument 15 (flux meter), which consists of a rotatable element 16 having a coil 17 wound thereon and a stationary magnetic field producing device 18, has its coil 17 connected in series with the secondary winding 13 on the magnetic core 11 and is provided to control operation of a control circuit 19, which in turn controls the operation of a current producing unit 20 and controls the movement of a recording pen 21. The coil 17 is so connected in series with the winding 13 that the series connection is not disturbed when the element 16 rotates.

The adjustable current (or voltage) producing unit 20, which consists of a movable coil 22 and a stationary magnetic field producing device 23, also has its coil 22 connected in series with the secondary winding 13 and is provided to induce currents $I_3$, by moving the coil 22 relative to the magnetic field device 23, which oppose the currents $I_2$ induced in the secondary winding 13 by flux changes in the magnetic core 11. The movable coil 22 is provided with flexible leads 22A and 22B so that the coil 22 may be moved relative to the magnetic field 23 without disturbing the series connection with the secondary winding 13. The current producing unit 20 will also operate correctly if the coil 22 is stationary and the field 23 is movable with respect thereto.

The movable element 16 of the current responsive instrument 15 has a mirror 25 attached thereto and the mirror 25 is provided to control the amount of light projected on a pair of voltaic photocells 27A and 27B from a light source 28. The voltaic photocells 27A and 27B provide voltage outputs in response to light being projected thereon and are so connected in series that the voltage outputs provided thereby oppose each other.

When no current is induced in the secondary winding 13 on the magnetic core 11, the movable element 16 of the current responsive instrument 15 is in a nondeflected position and the mirror 25 is so positioned that essentially the same amount of light is projected on each of the photocells 27A and 27B so that a null differential output is provided across the photocells. When current $I_2$ is induced in the secondary winding 13 by flux changes induced in the magnetic core 11, the current flows through the coil 17 wound on the movable element 16 and induces an electromagnetic field which causes the movable element 16 to rotate within the magnetic field 18 (deflection of the movable element 16). The degree of initial deflection of the element 16 is proportional to the induced current $I_2$ initially applied to coil 17. However, in accordance with the principles of this invention, neither the position of the movable element 16 at the moment the induced current $I_2$ ceases (unless the flux change being measured is effected over a shorter period of time than the time lag of the measuring circuit), nor the final position of the movable element is proportional to the magnitude of the flux change being measured. Rather, it is the distance moved or traversed by the coil 22 that provides an indication of the total change in flux being measured. More specifically, the voltage established by the induced current $I_2$ has a magnitude which varies as a function of the rate of change in movement of the coil (or magnet 23, or the two relative to each other), with the integral of this voltage varying as a function of the magnitude of change in distance traversed by either the coil or magnet or the two relative to each other. Hence, when the coil 22, for example, has moved a distance sufficient to generate a voltage, the integral of which is equal, but opposite in sense, to the integral of the voltage established by the change in flux being measured, the movable element 16 will be at zero, and the distance actually traversed by the coil 22 will be a function of the total change in flux being measured. This will be more clearly understood from a discussion of the servo-controlled feedback circuit hereinafter. The mirror 25 also rotates, when the movable element 16 rotates, to cause a different amount of light to be projected on each of the photocells 27A and 27B so that a differential voltage output is provided across the photocells.

The photocells 27A and 27B are connected to a servo-amplifier 30 so that, when a differential voltage output is provided across the photocells, the differential voltage output is amplified and is transmitted to a servomotor 31 to initiate operation thereof. The servomotor 31 operates to move the recording pen 21 so that the amplitude of the flux change induced in the magnetic core 11 is indicated on a suitable recording medium, such as revolvable recording drum 32, and operates to move the coil 22 of the current producer 20 relative to the magnetic field 23 so that a current $I_3$ is electromagnetically induced thereby which opposes the current $I_2$ induced in the secondary winding 13 by the flux change in the magnetic core 11. The recording pen 21 may be utilized alone to indicate the amplitude of the flux change induced in the magnetic core 11 or it may be utilized in conjunction with rotation of the recording drum 32 to provide a magnetic hysteresigraph as set forth below.

Because of the time lag involved in operation of the circuit components, the current $I_3$ induced by movement of the coil 22 relative to the magnetic field 23 lags timewise behind the current $I_2$ induced by the flux change in the magnetic core 11. Thus, even though the current $I_3$ increases as the current $I_2$ increases, the current $I_2$ is always slightly greater than the current $I_3$ at any given instant because of the time lag between $I_3$ and $I_2$. However, if the flux change induced in the magnetic core 11 is slowly induced, the time lag between $I_3$ and $I_2$ is of no practical consequence and the movable element 16 of the current responsive instrument 15 is substantially nondeflected while a flux change is being induced in the magnetic core 11. In this case, when a flux change ceases to be induced in the magnetic core 11, the current $I_2$ ceases and the current $I_3$ induced by movement of the coil 22 relative to the magnetic field 23 only momentarily passes through the coil 17 on the movable element 16 of the current responsive instrument 15 (the actual duration of the current $I_2$ alone being dependent upon the time lag of the servo-controlled feedback circuit), and induces a momentary reverse electromagnetic field sufficient to cause the slightly deflected movable element 16 of the current responsive instrument 15 to be returned to the nondeflected position so that the servomotor 31 ceases to operate. In the case of measuring more rapid changes in flux, the initial deflection of the movable element may be considerably greater than the deflection resulting from measuring slow rates of change in flux. However, unless the total flux change occurs within a period of time which is shorter than the inherent time-lag of the servo-controlled feedback circuit, which would normally not happen, the initial deflection of the movable element 16 will be reduced by an amount dependent upon the predetermined magnitude of and the time during which the induced current $I_3$ counters the induced current $I_2$ before the latter ceases. When the induced current $I_2$ does cease, the induced current $I_3$ continues until such time that the movable element 16 is moved back to the non-deflected position, the time necessary to accomplish this being short in the absence of the opposing current $I_3$.

The recording pen 21 and the coil 22 of the current producer 20 are driven by the servomotor 31 in accordance with the amplitude of the flux change induced in the magnetic core 11. The speed of operation of the servomotor 31 is dependent on the output of the servoamplifier 30, and the servomotor 31 is selected so that it reaches its maximum speed when a very small differential output exists between the photocells 27A and 27B. Thus, the speed of operation of the servomotor 31 is essentially constant regardless of the amplitude of the differential output so that the recording pen 21 and the coil 22 are driven at an essentially constant rate as long as a differential photocell output exists. This feature is desirable for rapid response of the circuit, but is not essential to operation thereof.

If it is desirable to plot the hysteresis loop of the magnetic core 11 on the revoluble recording drum 32 rather than merely plotting the flux change induced therein, the recording drum 32 must be rotated in accordance with the H coordinate (magnetizing force) of the hysteresis loop of the magnetic core 11, which is a function of the magnetizing current $I_1$. The recording pen 21 is driven by the servomotor 31 in accordance with the B coordinate (flux density) of the hysteresis loop since the B coordinate is a function of the flux change in the magnetic core 11.

When a linear relationship exists between the H coordinate and the magnetizing current $I_1$ provided by the input current source 14, the recording drum 32 is rotated in accordance with the changes in the amplitudes of the magnetizing current $I_1$ provided by the current source 14.

A resistor 35 is connected in series with the primary winding 12 on the magnetic core 11 and the input current source 14. The voltage drop across the resistor 35, which is proportional to the amplitude of the current $I_1$, is applied to a control device 37 (potentiometer recorder) that is provided to operate a motor 38 which rotates the recording drum 32 in accordance with the amplitude of the voltage drop across the resistor 35.

When a nonlinear relationship exists between the H coordinate and the magnetizing current $I_1$, a circuit similar to the circuit which controls the operation of the servomotor 31 is used to control operation of the recording drum motor 38.

The sensitivity of the circuit may be varied by altering the number of winding turns for the movable coil 22 of the current producer 20 and/or by altering the strength of the magnetic field 23 of the current producer 20 since the sensitivity is determined by the maxwell turns per unit of motion for the current producer 20. The circuit may be made more sensitive by reducing the number of winding turns for the movable coil 22 and/or reducing the strength of the magnetic field 23. If the number of winding turns for the movable coil 22 or the strength of the magnetic field 23 is reduced to a zero value, the circuit will have infinite sensitivity (theoretically) since infinite relative movement between the coil 22 and the field 23 will be required to compensate for current $I_2$ induced by a flux change in the magnetic core 11.

FIG. 2 illustrates alternate circuitry which may be added between the servomotor 31 and the recording pen 21 to provide for altering the sensitivity of the circuit so that the current producing unit 20 may be maintained with a predetermined number of winding turns for the coil 22 and with a predetermined strength for the field 23.

The servomotor 31 operates to move the slider (tap) 40 of a potentiometer 41 which is connected across a voltage source 42 so that the voltage drop across the tapped portion of the potentiometer 41 is varied when a differential voltage output is provided across the photocells 27A and 27B. The tapped portion of the potentiometer 41 is connected through a variable resistor network 43, such as an Ayrton Universal Shunt disclosed on page 61 of the text, Electrical Measuring Analysis by Ernest Frank, to a potentiometer recorder 44 which is provided to operate a servomotor 45 that drives the recording pen 21 in accordance with the change in voltage drop across the tapped portion of the potentiometer 41. The variable resistor network 43 is provided so that the sensitivity of the recording pen 21 may be varied by varying the values of the resistors therein.

Thus, it may be seen that a circuit has been provided for indicating flux changes induced in a magnetic component wherein a current responsive instrument, for controlling operation of the circuit, is maintained in a substantially nondeflected position during an indicating operation and is returned to the nondeflected position at the completion of an indicating operation and wherein the deflection of the current responsive instrument during an indicating operation is not proportional to the amplitude of the flux change.

While specific embodiments of the invention have been described in detail, it will be obvious that various modifications may be made from the specific details described without departing from the spirit and scope of the invention.

What is claimed is:

1. A circuit for measuring magnetic flux changes, which comprises:
   a galvanometer;
   flux detecting means connected to said galvanometer for applying thereto a first voltage whose magnitude is a function of the rate of flux change being measured and whose integral is a function of the total flux change being measured;
   adjustable voltage inducing means, including a coil and magnet means movable relative to each other, connected to said galvanometer for inducing a second voltage therein in response to one of said coil and magnet means moving from a first position to a second position relative to the other, said second voltage being opposed to the first voltage applied to said galvanometer by said flux detecting means and having a magnitude which varies as a function of the rate of change in movement of the one of said coil and magnet means relative to the other, the integral of said second voltage varying as a function of the magnitude of change in distance traversed by the one of said coil and magnet means relative to the other in moving from said first to said second position;
   a servomotor mechanically coupled to one of said movable coil and magnet means for moving the coupled one of said coil and magnet means when said servomotor is energized;
   detecting means having an output connected to said servomotor and being responsive to the initial deflection of said galvanometer, effected by at least the initial application of said first voltage to said galvanometer, for producing an output signal of substantially constant amplitude to drive said servomotor for as long as said galvanometer remains in at least a slightly deflected position, the duration of said output signal being dependent on the time necessary for said servomotor to move one of said coil and magnet means relative to the other over a distance sufficient to generate a second voltage whose integral is equal to the integral of the induced first voltage, whereby the initially deflected galvanometer is returned to its non-deflected position, at which time said output signal is cut off and said servomotor stops, and
   means for indicating the distance traversed by the one of said coil and magnet means coupled to said servomotor, said distance being a function of the total flux change being measured.

2. A circuit for measuring magnetic flux changes in accordance with the claim 1, wherein said coil is driven by said servomotor.

3. A circuit for measuring magnetic flux changes, which comprises:
   a galvanometer of the fluxmeter type;
   flux detecting means connected to said galvanometer for applying thereto a first voltage whose magnitude is a function of the rate of flux change being measured and whose integral is a function of the total flux change being measured;
   adjustable voltage inducing means, including a movable coil and stationary magnet means, connected to said galvanometer for inducing a second voltage therein in response to the movement of said coil relative to said magnet means from a first position to a second position, said second voltage being opposed to the first voltage induced in said galvanometer by said flux detecting means and having a magnitude which varies as a function of the rate of change in movement of said coil relative to said magnet means, the integral of said second voltage varying as a function of the magnitude of change in distance traversed by said coil relative to said magnet means in moving from said first to said second position;
   a servomotor mechanically coupled to said coil for moving said coil at a controlled rate of speed when said servomotor is energized;
   detecting means having an output connected to said servomotor and being responsive to the initial deflection of said galvanometer, effected by at least the initial application of said induced first voltage applied to said galvanometer from said flux detecting means, for producing an output signal of substantially constant amplitude to drive said servomotor for as long as said galvanometer remains in at least a slightly deflected position, said servomotor moving said movable coil relative to said magnet means at a substantially constant rate of speed to generate said second voltage of predetermined magnitude in opposition to the first voltage from said flux detecting means, the duration in which said second voltage is generated and applied to said galvanometer after cessation of said induced first voltage being dependent on the time necessary for the integral of said second voltage to equal the integral of the first voltage, said duration of the second voltage being very short for slow rates of change in flux being measured, as the second voltage maintains said galvanometer very near its non-deflected position throughout the period in which the first voltage is applied to said galvanometer, whereas for more rapid rates of change in flux being measured, said duration of the second voltage after cessation of the first voltage is progressively longer, as the first voltage deflects said galvanometer a greater distance before said second voltage is established in opposition thereto, whereby for both slow and rapid rates of change in flux being measured, the total flux change is independent of the degree of galvanometer deflection during the measurement period and is directly proportional to the distance traversed by the movable coil in effecting the generation of the induced second voltage to move the galvanometer to its final, non-deflected position, and means for indicating the distance traversed by said movable coil, said distance being a function of the total flux change being measured.

References Cited by the Examiner

UNITED STATES PATENTS

| | | | |
|---|---|---|---|
| 2,054,672 | 9/1936 | Edgar | 324—43 |
| 2,367,614 | 1/1945 | Rich | 324—47 |
| 3,001,131 | 9/1961 | Oliver | 324—74 |

RICHARD B. WILKINSON, *Primary Examiner.*

WALTER L. CARLSON, *Examiner.*

F. A. SEEMAR, *Assistant Examiner.*